United States Patent [19]
Manning

[11] Patent Number: 5,999,293
[45] Date of Patent: Dec. 7, 1999

[54] OPTICAL SWITCH

[75] Inventor: Robert J Manning, Ipwich, United Kingdom

[73] Assignee: British Telecommunications public limited company, London, United Kingdom

[21] Appl. No.: 08/875,174

[22] PCT Filed: Jan. 16, 1996

[86] PCT No.: PCT/GB96/00072
 § 371 Date: Jul. 23, 1997
 § 102(e) Date: Jul. 23, 1997

[87] PCT Pub. No.: WO96/22562
 PCT Pub. Date: Jul. 25, 1996

[30] Foreign Application Priority Data

Jan. 19, 1995 [GB] United Kingdom ............... 9501025
Mar. 3, 1995 [EP] European Pat. Off. .......... 95301366

[51] Int. Cl.[6] .................. H04J 14/08; H04J 14/02; H04B 10/00
[52] U.S. Cl. ............ 359/139; 359/139; 359/138; 359/128; 359/158
[58] Field of Search ............ 359/128, 138, 359/158, 139

[56] References Cited

U.S. PATENT DOCUMENTS

| | | | |
|---|---|---|---|
| 4,912,706 | 3/1990 | Eisenberg et al. | 370/105.1 |
| 5,309,267 | 5/1994 | Huang | 359/139 |
| 5,548,433 | 8/1996 | Smith | 359/158 |

*Primary Examiner*—Jason Chan
*Assistant Examiner*—MoHammad Sedighian
*Attorney, Agent, or Firm*—Nixon & Vanderhye P.C.

[57] ABSTRACT

An optical switch includes a semiconductor gain medium and inputs for an optical control signal applied to the semiconductor gain medium. The switch has a pair of arms (31, 32) arranged in a Mach-Zehnder configuration. A semiconductor gain medium (SOA1, SOA2) is connected in each arm. A fixed phase shifting element PE is also connected in one arm. Control signals are applied to each of the semiconductor gain media. There is a delay between the control signals selected so that a desired one of the optical pulses experiences a differential phase shift and so we switch to a different output of the multiplexer. In one example, the semiconductor gain media are provided by discrete semiconductor devices sandwiched between a pair of planar substrate on which waveguides forming the other components of the switch are formed. The switch may be used for demultiplexing OTDM signals.

18 Claims, 5 Drawing Sheets

OPTICAL SWITCH

BACKGROUND TO THE INVENTION

The present invention relates to an optical switch which might be used, for example, as a demultiplexer for adding or dropping OTDM (optical time-division multiplexing) channels in an optical telecommunications system.

It has been recognised that in order to achieve the highest possible bit rates (e.g. of 100 Cbit/s or more) in optical transmission systems it is desirable that functions such as adding or dropping a channel should be carried out entirely in the optical domain. It has previously been proposed to carry out such functions using a non-linear loop mirror (NOLM) in which the non-linearity is provided by a semiconductor gain medium which is positioned asymmetrically in the loop. Incoming optical data is split into two counter-propagating components. Because the semiconductor gain medium is positioned asymmetrically, one of these components passes through it before the other. Accordingly, if an optical control signal is applied to the gain medium to switch it after the first component has passed through but before the second counter-propagating component has arrived, then the two components experience different phase shifts through the semiconductor gain medium, producing a differential phase shift which may used to switch the signal to determine whether it is transmitted or reflected by the NOLM.

Although, as described in the present applicant's co-pending International application PCT/GB94/02240, it is found to be possible to operate such as NOLM at switching rates higher than the saturation recovery time of the semiconductor optical gain medium, nonetheless there remains a fundamental upper limit to the possible switching speeds determined largely by the transit time associated with the semiconductor gain medium. In use, there has to be time for the first pulse to pass through the gain medium, then for the gating pulse to pass through, and subsequently for the second pulse to pass through the medium. This limits the possible bit-rate which can be handled by the switch.

SUMMARY OF THE INVENTION

According to a first aspect of the present invention, an optical switch comprising a semiconductor gain medium and means for applying an optical control signal to the semiconductor gain medium is characterised by a pair of arms arranged in a Mach-Zehnder configuration with a respective semiconductor gain medium connected in each arm, in use respective control signals being applied to each semiconductor gain medium with a delay between the control signals selected so that a differential phase shift is applied to an input optical signal propagating through the arms of the switch, and by a phase control element connected in one of the arms of the switch and arranged to cancel a phase offset between pulses propagating in the two arms.

The present invention provides an optical switch using a semiconductor optical gain medium arranged in such a way that the switching rate is not limited by the transit time of the gain medium. To this end, a pair of semiconductor gain elements are used in the two arms of a Mach-Zehnder interferometer. By appropriate control of the period and relative delay of a sequence of control pulses applied to the respective gain media, a differential phase shift can be applied to a selected one or more of the pulses in an optically encoded data stream so that selected pulses are output from a different port of the switch. The switching rate is not limited by the transit time of the semiconductor gain media and so higher rates can be achieved than hitherto has been possible. Furthermore, the switch achieves contrast/extinction ratios superior to those of conventional NOLM switches when used at high bit-rates.

As will be further described below, while the selected one or more pulses experience a differential phase shift, e.g. of $\pi$, the other pulses experience a small differential phase shift from the two semiconductor gain media correlated to the delay between the two control sequences. However, the present inventors have found that this residual differential can be substantially entirely cancelled by the provision of a simple phase-shifting element in one of the arms of the Mach-Zehnder interferometer.

Preferably the switch is a demultiplexer arranged to select one or more pulses from an input optical pulse stream.

The high switching rates and excellent contrast ratios obtainable with the switch of the present invention make it particularly valuable as an optical demultiplexer suitable for use in optical telecommunication systems. The input pulse stream might comprise, for example, a series of OTDM frames with the demultiplexer being used to select a given one or more channels from each OTDM frame for routing to a different output port.

According to a second aspect of the present invention, there is provided a method of switching an optical signal to select one or more pulses from a pulse stream, the method including applying the signal to a semiconductor gain medium, and applying an optical control signal to the semiconductor gain medium, characterised by splitting the optical signal between a pair of arms arranged in a Mach-Zehnder configuration and passing the signal in each arm through a respective semiconductor gain medium, applying respective optical control signals to each semiconductor gain medium with a delay between the control signals selected so that a differential phase shift is applied to the signal, and applying a further phase shift to cancel a phase offset between pulses propagating in the pair of arms.

According to a third aspect of the present invention an optical demultiplexer arranged to select one or more pulses from an input optical pulse stream is characterised by a switch in accordance with the first aspect of the present invention arranged to switch the selected one or more pulses in response to the said control signals.

Another important field of use for the optical switch of the present invention is in signal processing and clock recovery. The switch may advantageously be substituted for the non-linear optical modulator (NOM) of a clock recovery circuit such as those described and claimed in the present applicant's published International application WO93/22855 (PCT/GB93/00863).

The switch may also be used as a correlator for sampling a repetitive optical signal. Used in this manner it might form the basis of an "all-optical" oscilloscope (that is to say an oscilloscope in which signal sampling is carried out in the optical domain) or other test instrument. In this case the control signals applied to the semiconductors would take the form of a repetitive periodic signal having a frequency close to but different from the frequency of the signal to be sample, differing, for example, by a few kHz.

DESCRIPTION OF THE DRAWINGS

Embodiments of the present invention will now be described in further detail, by way of example only, with reference to the accompanying drawings in which.

DESCRIPTION OF EXAMPLES

Figure 1:
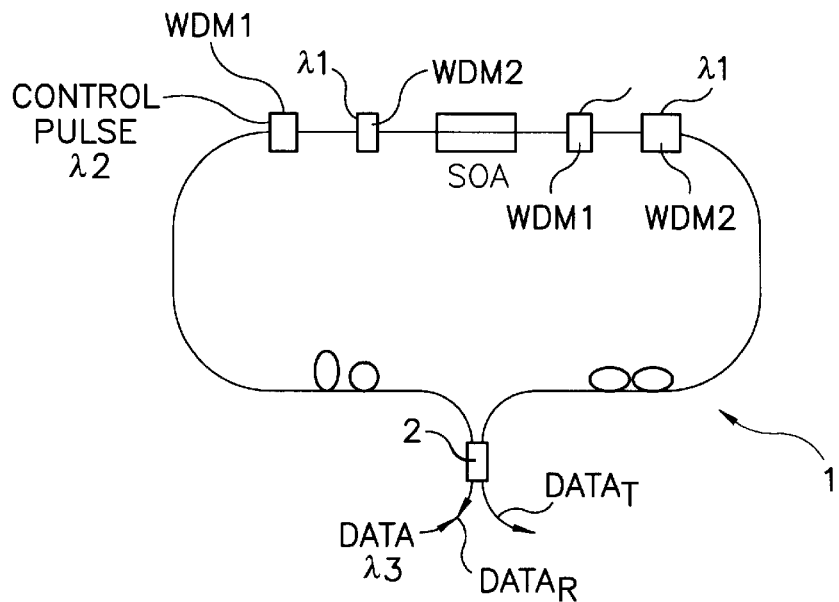
FIG. 1 is a schematic of a conventional NOLM.

FIG. 1 shows a prior art optical demultiplexer using a non-linear loop mirror (NOLM). The loop 1 includes a semiconductor optical amplifier SOA which is positioned asymmetrically in the loop, that is to say the path length from the SOA to one input of the coupler differs from the path length to the other input of the coupler. An optical pulse stream at wavelength $\lambda_3$ is input to the loop via the coupler 2. It is split into two counter-propagating portion.

The SOA is switched by a stream of optical control pulses at wavelength $\lambda_2$ (where $\lambda_2$ is different from $\lambda_3$) which are coupled into and out of the loop by wavelength division multiplexers WDM1.

In use, when a control pulse at $\lambda_2$ passes through the SOA it sweeps out the excess population of carriers in the SOA and thereby causes a change in the refractive index at the data wavelength $\lambda_3$. Therefore, when a control pulse is timed to pass through the SOA after one of the counter-propagating portions and before the other, the different portions experience different phase shifts, and this differential phase change can be used to switch the pulse to determine whether it is reflected or transmitted at the coupler 2.

In the example shown in FIG. 1, an additional holding beam at wavelength $\lambda_1$ is used to pump the SOA so as to speed its recovery time after depletion by a control pulse. This holding beam at wavelength $\lambda_1$ is coupled into and out of the loop by a second pair of wavelength division multiplexers WDM2 positioned on either side of the SOA. The use of the holding beam speeds the recovery of the carrier population levels after depletion by the passage of a control pulse and makes possible increased switching rates, as described in out above-cited co-pending International application.

Figure 2:
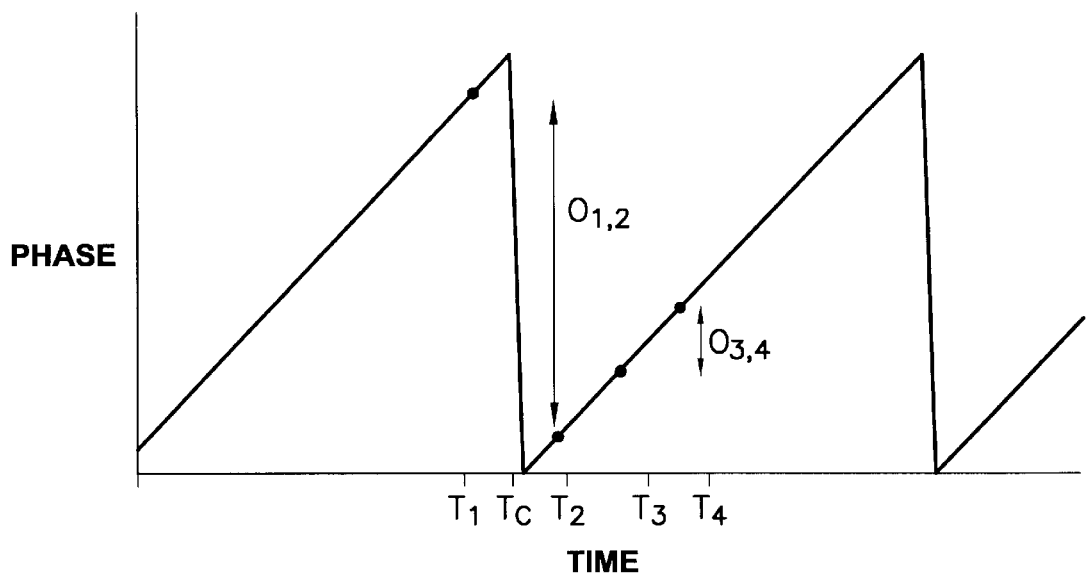
FIG. 2 is a graph showing the phase response of the NOLM of FIG. 1.

FIG. 2 shows how the phase change imposed by the SOA varies as it is clocked by a regular stream of control pulses at $\lambda_2$. In order to switch data pulses from being wholly reflected to being wholly transmitted, it is necessary to provide a differential phase shift of $\pi$. The magnitude of the phase shift is determined by the intensity of the optical control pulses, by the electrical bias applied to the SOA and by the length of the SOA. These are set so that, as illustrated, there is a difference of $\pi$ between the phases experienced by a data pulse arriving at instant T1 an a second pulse arriving at T2, $T_C$ falling between T1 and T2 is the time of arrival of the clock pulse. Ideally data pulses arriving at other times should experience the same phase shift in the SOA, and so overall experience no differential phase shift. However, when the switch is operating over time scales significantly shorter than its recovery time, in practice the carrier population and hence the refractive index is varying continuously and so pulse portions arriving, e.g., at times T3 and T4 still experience a residual differential phase shift $\phi_{3,4}$. This limits the extinction ratio which the switch can achieve. Furthermore, as discussed in the introduction, there is a fundamental limitation the maximum possible switching rate as a result of the finite transit time associated with the SOA.

Figure 3:
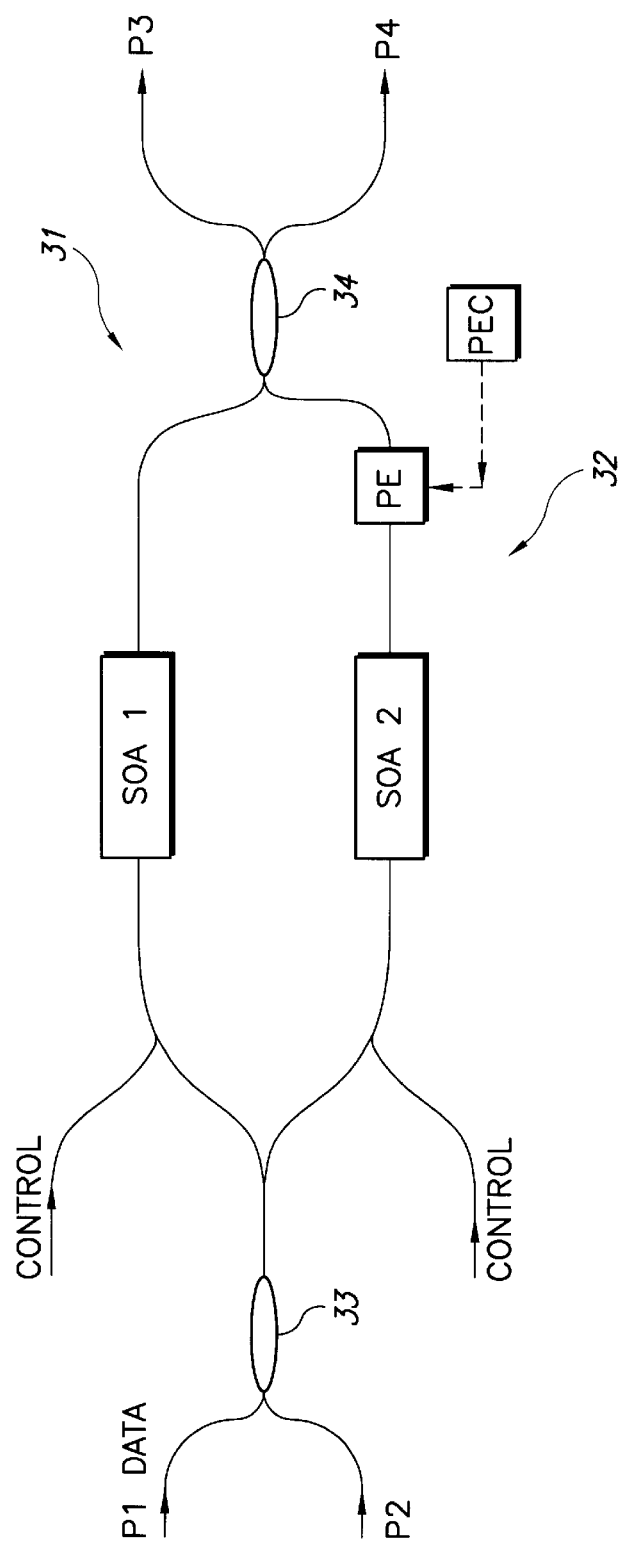
FIG. 3 is a first example of a demultiplexer embodying the present invention.

FIG. 3 shows a first example of an optical demultiplexer embodying the present invention. The demultiplexer is configured as a Mach-Zehnder interferometer having first and second arms 31, 32. Respective semiconductor optical amplifiers SOA1, SOA 2 are connected in each arm. Inputs are provided in each arm for a control signal gong to each SOA. In use, the data pulse stream at $\lambda_3$ is input at one port P1 of an input coupler 33. This is a 50:50 directional coupler which splits the input signal equally between the two arms of the interferometer. After passing through the SOAs the optical signals are recombined at the output coupler 34 and output from one or other of its two ports P3, P4 depending upon the differential phase shift produced by the SOAs.

Figure 4:
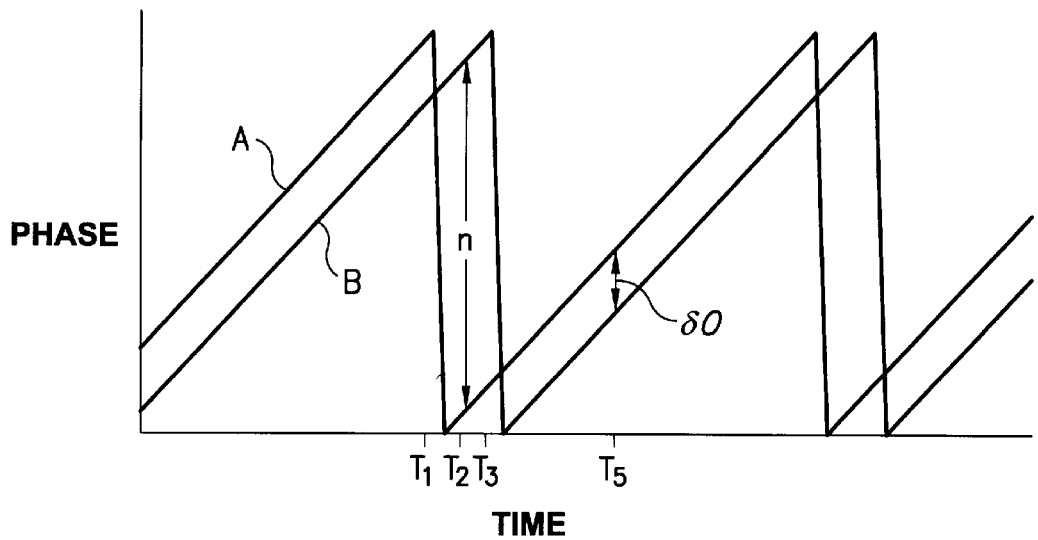
FIG. 4 is a graph showing the phase response of the demultiplexer of FIG. 3.

Whereas in the prior art the differential phase shift was produced by the use of data pulses arriving at different times at the SOA, using the configuration of the present invention this is not necessary. The data pulses can arrive simultaneously at the SOAs and so the bit rate of the data pulses is not limited by the transit time of the SOAs. The differential phase shift is achieved by the use of a time off-set between sequences of control pulses applied to the different SOAs. A planar optical delay line may be used to split a control signal from an appropriate source to provide two control pulse streams with a predetermined delay between them. Referring to FIG. 4, where curve A is the phase of SOA1 and curve B is the phase of SOA2, then a control pulse arrives at SOA1 at instant T1. The corresponding control pulse for SOA2 is delayed so that it arrives at a later instant T3. The timing of these control pulses and their relative delay are chosen so that they bracket the arrival of a data pulse at the SOAs at time T2. At that time SOA1 has just been depleted by the control pulse, while SOA2 has not yet received the control pulse. The different portions of the pulse in SOA1 and SOA2 therefore experience different phase shifts, producing a phase differential of $\pi$. As a result of this phase shift when the portions are recombined in the output coupler 34 this selected pulse is output from port P3. By contrast, a later arriving data pulse at time T5 experiences only a small differential phase shift $\delta\phi$ and so is output almost entirely from port P4.

The residual differential $\delta\phi$ is eliminated entirely so that for data pulses other than the selected pulse the phase differential is zero. This is achieved by adding in one of the arms of the interferometer a phase shifting element PE which adds a permanent phase differential equal to $\delta\phi$. Then, the demultiplexer produces an optimum total differential phase shift of $\pi$ for the selected pulses and 0 for the other pulses. The addition of the phase shifting element PE is equivalent in effect to shifting curve B upwards by $\delta\phi$, thereby eliminating the difference in the phase shift experienced by the pulse portions in the different SOAs at, e.g., time T5.

The phase shifting element PE may be formed, for example, from a length of germanium-doped silica waveguide having a length and doping level chosen to provide the desired phase shift. Alternatively the element PE may be formed from a photosensitive glass. Then in the fabrication of the circuit, after the completion of the other elements, the switch may be operated and the output levels from one or other of the output ports P3, P4 monitored. The photosensitive glass is then illuminated at an appropriate ultra-violet wavelength and the intensity of the illumination increased until the monitored circuit output from P3 and/or P4 is optimised. An appropriate photosensitive glass for these purposes is described in reference (3) cited on page 10 below.

In some fields of use it may be desirable for the phase element PE to be adjustable after fabrication. In this case it may take the form of an electro-optic element such as a lithium niobate cell. Alternatively the element may be provided by a further semiconductor optical amplifier whose phase delay is adjustable by adjusting its electrical drive current. Where such an adjustable phase element PE is used, then a control circuit (PEL) using a feedback loop from the output of the switch may be used to provide the control signal to the phase element to ensure that the phase differential is always optimally cancelled. The control circuit may include a photodetector which detects the output of the switch.

Figure 5:
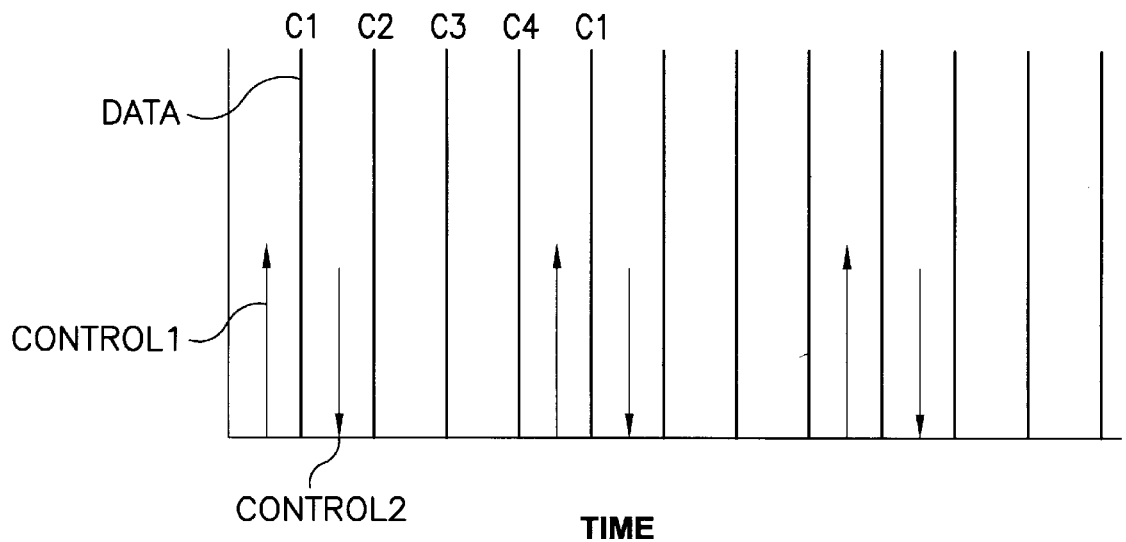
FIG. 5 is a timing diagram showing the data and control pulses for the demultiplexer of FIG. 3.

Typically the pulses to be selected by the demultiplexer will be one or more time slots corresponding to specific OTDM channels at a bit-rate of, e.g., 100 Gbit/s. In the example shown in FIG. 5, channel 1 of four channels is to be selected. The control pulses therefore comprise a sequence with a period equal to the OTDM frame period. The time off-set between the pulses applied to SOA1 and SOA2 is chosen to be greater than the data pulse width but less than the data bit period. It can be seen that any other arbitrary channel may be selected by advancing the timing of the control pulses appropriately with respect to the data pulses.

Figure 6A:
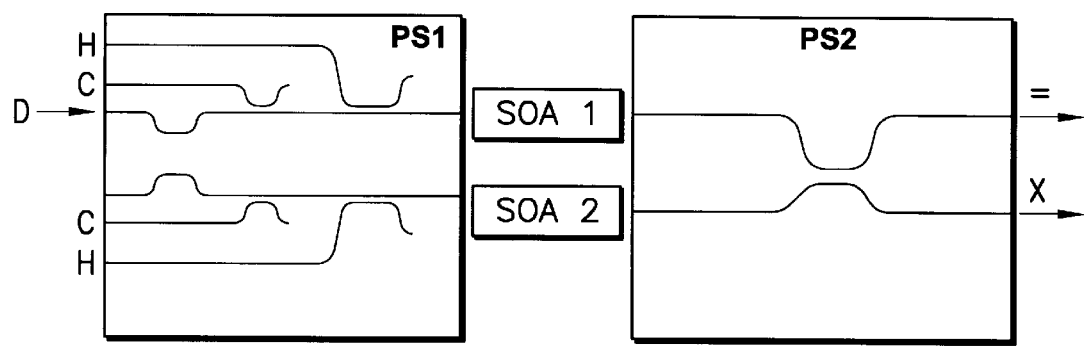
FIG. 6a is a hybrid circuit implementing the demultiplexer of FIG. 3

FIG. 6 shows a circuit implementing the multiplexer shown schematically in FIG. 3. This is a hybrid circuit combining planar silica technology with discrete semiconductor components for the SOAs. Each SOA is an InP-based semiconductor laser amplifier with the gain medium angled at 10° with respect to the faces of the silica substrate and tapered at its ends. Where the SOA is, for example, 2 mm long, then the gain medium has a taper of 500 $\mu$m length at each end. In this example, the width of the gain medium reduces from 1.3 $\mu$m to 0.2 $\mu$m along the length of the taper. These SOAs are sandwiched between a pair of planar silica circuits which provide the input and output ports of the demultiplexer as well as the couplers and splitters illustrated in FIG. 3. The tapering of the SOA gain medium at its ends improves the efficiency of the mode coupling between the SOA and the silica circuit. The angle of the SOA gain medium with respect to the normal to the end faces of the SOA, and of the waveguides, serves to reduce internal reflections, which otherwise might cause feedback in the devices.

The couplers in this example, are all directional couplers arranged to provide a 50:50 coupling ratio. On the input side of the planar silica there are provided input ports for a holding beam H and control signal C respectively for the first SOA and a corresponding pair of inputs for the second SOA together with an input for the data pulse stream D. On the output side there are corresponding output ports for control and holding beams together with the straight-through and cross-over output ports for the data.

Figure 6B:
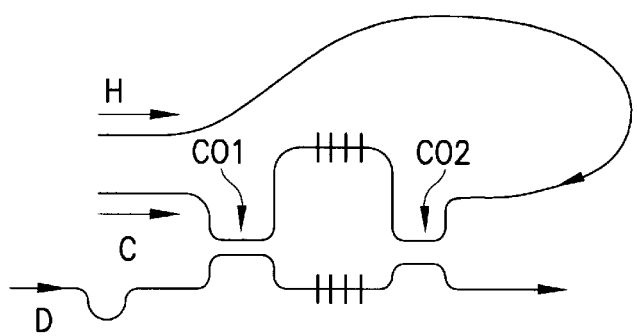
FIG. 6b is a detail of an alternative topology of the input side of the hybrid circuit.

In an alternative configuration shown in FIG. 6b, a looped path may be provided in the silica for the holding and control beams using a reflection grating etched in the waveguide core between pairs of directional couplers. Alternatively, a photo-refractive grating might be used. The two directional couplers CO1, CO2 and the arms of the waveguides between the couplers are in the form of a Mach-Zehnder interferometer and the reflection gratings control the phase bias of the different arms of the interferometer. The bias is set so that both of the input signals C and D are output from a single arm of the interferometer system and fed to the SOA. This system allows coupling of C and D with close to 100% efficiency. Where a holding beam H is used, then this in general will be at a different wavelength for which the grating functions as a reflective grating. The holding beam may be longer or shorter in wavelength but within the gain bandwidth of the SOA, which is typically around 50 nm. The data pulses may be within the gain bandwidth or at longer wavelengths. As shown, H is introduced into the coupler/interferometer system in the opposite direction to the data and control signals. Circuits of this type are described in further detail in:

(1) "Integrated four channel Mach-Zehnder multiplexer/demultiplexer fabricated with phosphorous doped $SiO_2$ waveguides on Si" by Verbeck et al, Journal of Lightwave Electronics pp1011–1015, 6(6), '88.

(2) "Silica-based integrated optic Mach-Zehnder multiplexer/demultiplexer family with channel spacing of 0.01–250 nm" by Takato et al, IEEE Journal on selected areas in communications, pp1120–1127, 8(6), '90.

(3) "Laser-trimmed four-port bandpass filter fabricated in single-mode photosensitive Ge-doped planar waveguide" by Kashyap et al, IEEE Photonics Technology Letters, pp191–194, 5(2), Feb. '93.

It should be noted in relation to this and to the other embodiments described that the use of a holding beam H is not essential, but may be omitted. In many circumstances, sufficient switching speed can be obtained simply by appropriate electrical bias of the SOAs without use of an optical holding beam.

Figure 7:
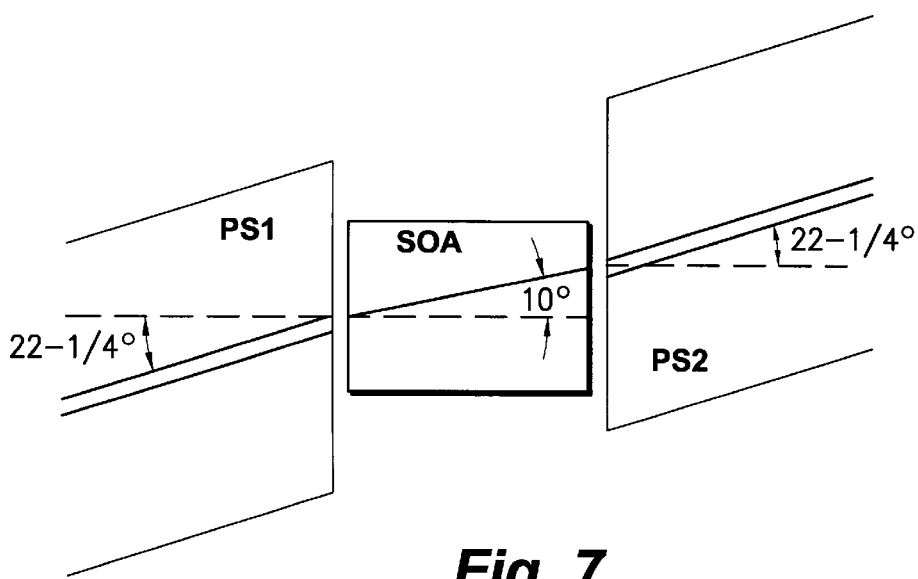
FIG. 7 is a detail showing the interface between the planar circuits and the SOA; and, FIG. 8 is a circuit diagram of an optical clock recovery circuit.

In this example, the waveguide channels in the planar waveguide have a width and depth of 5 microns and a refractive index gradient $\Delta n=0.01$. As shown in FIG. 7, at the interface with the SOAs the facet of the silica waveguide is angled at 22¼°. This geometry combined with the tapering of the core of the SLA at its ends to provide mode matching between the SOA active channel and the waveguides ensures maximum coupling efficiency between the planar circuits and the SOA devices.

Figure 8:
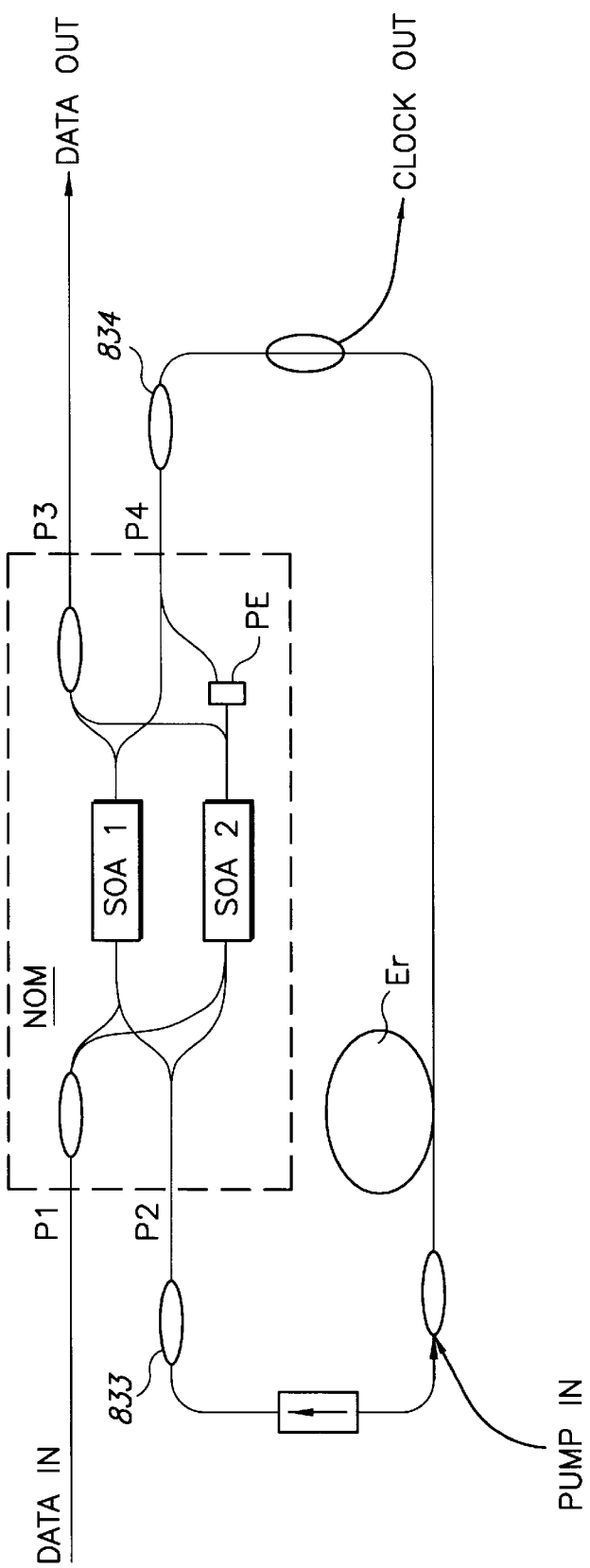

The switch of the present invention is be no means limited in use to optical demultiplexing. Another important field of application is in optical clock recover. Our above-cited earlier International application describes and claims a number of circuits for recovering a timing waveform for use in subsequent processing of an optical signal. The circuits are based upon the use of a non-linear optical modular (NOM) connected in the optical cavity of a mode-locked laser. The optically encoded signal is applied to the optical modulator and modulates the phase and/or amplitude of light in the optical path of the laser cavity thereby locking the phase and frequency of the output pulse stream to the timing wave of the optically encoded signal. FIG. 8 shows a clock recovery circuit using the optical switch of the present invention as the non-linear optical modulator. The switch of FIG. 3 in this case is connected into the optical cavity of a fibre-ring laser via ports P2 and P4. The control signal for the SOAs is derived by splitting the input datastream (that is the stream from which the clock is to be recovered) and applying it to the two SOAs via an optical delay line to give the required delay. The output coupler 834 is chosen to provide, e.g., a 60:40 splitting ratio between ports P3 and P4. Accordingly the switch in effects modulates the amplitude of the output signal depending on which port it is switched to.

The other components for the clock recovery circuit are conventional and are described in further detail in our above-cited International application. In the example shown in the Figure, they include an isolator and an Er-doped fibre amplifier. Alternatively, the mode-locked laser may use a Semiconductor Laser Amplifier to provide the active medium, and in this case advantageously the SLA and the switch may be formed as an integrated semiconductor device.

A further use for the switch is in an "all-optical" oscilloscope or other test instrument. In this case the switch acts as a correlator. A circuit in the form shown in FIG. 3 is used, with an optical signal to be sample input at port P1. The control signal is then a repetitive optical signal with a frequency different from but close to the repeat period of the data to be sampled. There is then a "walk-through" effect as the switch samples and outputs from port P4 successive portions of the signal input at P1.

The switch of FIG. 3 may be used with a continuous wave input at P1 rather than a pulsed datastream. The switch then functions as a pulse width modulator with the width of an output pulse from P4 determined by the relative delay between the two input control signals.

I claim:

1. An optical switch comprising:
   a) a pair of arms (31, 32) arranged in a Mach-Zehnder configuration with a respective semiconductor gain medium (SOA1, SOA2) connected in each arm; and
   b) means for applying an optical control signal to the semiconductor gain media, in use respective control signals being applied to each semiconductor gain medium with a delay between the control signals selected so that a differential phase shift is applied to an input optical signal propagating through the arms of the switch, and
   c) a phase control element (PE) connected in one of the arms (32) of the switch and arranged substantially to cancel the residual phase offset, due to the recovery characteristic of the semiconductor gain medium, between pulses propagating in the pair of arms.

2. A switch according to claim 1, including waveguides formed on a planar substrate.

3. A switch according to claim 2, in which the semiconductor gain media are provided by one or more discrete semiconductor devices (SOA1, SOA2) coupled to the said waveguides on the planar substrate.

4. A switch according to claim 3, in which the discrete semiconductor device (SOA1, SOA2) is coupled between a first planar substrate (PS1) providing inputs for the input optical signal and for the control signal and including waveguides configured to provide the input side of the two arms of the Mach-Zehnder interferometer and a second planar substrate (PS2) including waveguides configured to provide the output side of the two arms of the Mach-Zehnder interferometer and outputs for the optical signal.

5. A switch according to claim 1 further comprising an input (H) for a holding beam arranged to pump the semiconductor gain media.

6. A switch according to claim 5, including a respective holding beam input (H) for each semiconductor gain medium.

7. An optical demultiplexer arranged to select one or more pulses from an input optical pulse stream, characterised by a switch according to claim 1 arranged to switch the selected one or more pulses in response to the said control signals.

8. A clock recovery circuit comprising a non-linear optical modulator (NOM) connected in the optical path of the laser cavity of a mode-locked laser, the modulator in response to an optically encoded input signal modulating pulses propagating in the cavity thereby locking the phase and frequency of the pulses to the timing wave of the optically encoded signal, characterised in that the non-linear optical modulator comprises a switch according to claim 1.

9. A method of switching an optical signal thereby selecting one or more pulses from a pulse stream including:
   a) splitting the optical signal between a pair of arms (31, 32) which are arranged in a Mach-Zehnder configuration;
   b) passing the signal in each arm through a respective semiconductor gain medium,
   c) applying respective optical control signal to each semiconductor gain medium with a delay between the control signals selected so that a differential phase shift is applied to the signal, and
   d) applying to the optical signal in one of the arms a further phase shift and thereby cancelling the residual phase offset due to the recovery characteristic of the semiconductor gain medium between pulses propagating in the pair of arms.

10. A method according to claim 9, in which the further phase shift is applied in only one of the arms of the Mach-Zehnder interferometer, thereby substantially cancelling a residual phase differential.

11. A method according to claim 9, further comprising applying a holding beam to each semiconductor gain medium, thereby pumping the semiconductor gain medium.

12. A method of demultiplexing an optical pulse stream thereby selecting one or more pulses from the pulse stream, characterised by switching the optical pulse stream thereby selecting the said one ore more pulses by a method according to claim 9.

13. A method according to claim 12, in which the selected one or more pulses correspond to one or more OTDM channels and the control signal comprises a repetitive optical signal having a period corresponding to the frame repetition period of the DTDM pulse stream.

14. A method of recovering an optical clock signal including a step of driving a modulator in a mode-locked laser with the optically encoded signal, thereby generating in the laser a pulse train locked in phase and frequency to the timing wave of the optically encoded signal, characterised in that in the optical modulator the pulses propagating in the laser cavity are switched by a method according to claim 9.

15. An optical correlator including a switch according to claim 1.

16. An optical pulse width modulator comprising a switch according to claim 1 arranged to receive a continuous wave optical signal at an input port and to output an optical pulse of a duration determined by the relative delay of the said control signals.

17. A switch according to claim 1, including control means (PEC) for applying a control signal to the phase element (PE), thereby maintaining a desired phase offset.

18. A switch according to claim 17, in which the control means (PEC) include means responsive to the optical output of the switch arranged to generate a feedback control signal for the phase element (PE).

* * * * *